(12) United States Patent
Kimberly (10) Patent No.: US 7,037,865 B1
(45) Date of Patent: May 2, 2006

(54) COMPOSITE MATERIALS

(75) Inventor: Lawrence W. Kimberly, Farmington Hills, MI (US)

(73) Assignee: Moldite, Inc., Novi, MI (US)

( * ) Notice: Subject to any disclaimer, the term of this patent is extended or adjusted under 35 U.S.C. 154(b) by 231 days.

(21) Appl. No.: 09/634,522

(22) Filed: Aug. 8, 2000

(51) Int. Cl.
*D03D 25/00* (2006.01)
*D02G 1/20* (2006.01)

(52) U.S. Cl. .................. 442/181; 428/323; 428/402; 428/406; 428/407; 428/319.3; 428/292.1; 264/103; 523/218; 523/219

(58) Field of Classification Search ............... 523/218; 264/103; 428/292.1, 323, 402, 406, 407, 428/319.3
See application file for complete search history.

(56) References Cited

U.S. PATENT DOCUMENTS

| | | | |
|---|---|---|---|
| 3,477,967 A | 11/1969 | Resnick | |
| 3,541,194 A | 11/1970 | Resnick | |
| 3,652,486 A | * 3/1972 | Young | ............... 523/219 |
| 3,669,912 A | 6/1972 | Hinton | |
| 3,849,350 A | * 11/1974 | Matsko | ............... 521/54 |
| 3,931,047 A | 1/1976 | Smith | |
| 3,940,528 A | 2/1976 | Roberts | |
| 3,954,686 A | 5/1976 | Lagally | |
| 4,025,686 A | 5/1977 | Zion | |
| 4,039,718 A | 8/1977 | Kallenborn | |
| 4,053,448 A | 10/1977 | Holle | |
| 4,079,162 A | 3/1978 | Metzger | |
| 4,085,937 A | 4/1978 | Schenk | |
| 4,086,098 A | 4/1978 | Le Ruyet et al. | |
| 4,090,986 A | 5/1978 | Gormley et al. | |
| 4,095,008 A | 6/1978 | Sundstrom et al. | |
| 4,107,134 A | 8/1978 | Dawans | |
| 4,111,713 A | 9/1978 | Beck | |
| 4,151,155 A | 4/1979 | Chaplick | |
| 4,157,325 A | 6/1979 | Charles et al. | |
| 4,231,916 A | 11/1980 | Knappenberger et al. | |
| 4,238,641 A | 12/1980 | Planting et al. | |
| 4,250,136 A | * 2/1981 | Rex | ............... 264/257 |
| 4,259,223 A | 3/1981 | Rembaum et al. | |
| 4,330,634 A | 5/1982 | Rodaway | |
| 4,353,998 A | 10/1982 | Gagliani et al. | |
| 4,362,566 A | 12/1982 | Hinterwaldner | |
| 4,363,690 A | 12/1982 | Gagliani et al. | |
| 4,367,296 A | 1/1983 | Gagliani et al. | |
| 4,382,821 A | 5/1983 | Davis et al. | |
| 4,388,424 A | 6/1983 | Kennell et al. | |
| 4,399,992 A | 8/1983 | Molitor | |

(Continued)

FOREIGN PATENT DOCUMENTS

JP    3-155903    7/1991

OTHER PUBLICATIONS

"Microspheres" 3M and Zeelan Industries, Inc., 1994, 3 pages.

*Primary Examiner*—Glenn Caldarola
*Assistant Examiner*—Alexis Wachtel
(74) *Attorney, Agent, or Firm*—Michael S. Leonard; Everest Intellectual Property Law Group (57) ABSTRACT

New composite materials having a high density of small particles, such as hollow microspheres, in a matrix material are disclosed. The microspheres are densely packed in the matrix material such that adjacent microspheres are positioned in contact with each other or very close together. Fiber flanking may be provided on the opposite sides of a layer of a core of composite material having the small particles and matrix material. Also disclosed are methods of making and using the composite materials.

44 Claims, 3 Drawing Sheets

(1 of 3 Drawing Sheet(s) Filed in Color)

U.S. PATENT DOCUMENTS

| | | |
|---|---|---|
| 4,401,715 A | 8/1983 | Nomura et al. |
| 4,403,048 A | 9/1983 | Blitstein et al. |
| 4,405,543 A | 9/1983 | Murphy et al. |
| 4,423,097 A | 12/1983 | Mons et al. |
| 4,428,998 A | 1/1984 | Hawkinson |
| 4,447,565 A | 5/1984 | Lula et al. |
| 4,468,014 A | 8/1984 | Strong |
| 4,479,994 A | 10/1984 | Berg |
| 4,492,732 A | 1/1985 | Murphy et al. |
| 4,522,878 A | 6/1985 | Martin et al. |
| 4,528,305 A | 7/1985 | Henry |
| 4,556,603 A | 12/1985 | Thorsrud |
| 4,558,093 A | 12/1985 | Hatzenbuhler et al. |
| 4,560,523 A | 12/1985 | Plumley et al. |
| 4,595,623 A | 6/1986 | Du Pont et al. |
| 4,608,403 A | 8/1986 | Sellstrom |
| 4,681,718 A | 7/1987 | Oldham |
| 4,692,480 A | 9/1987 | Takahashi et al. |
| 4,726,986 A | 2/1988 | Cannady, Jr. et al. |
| 4,744,842 A | 5/1988 | Webster et al. |
| 4,788,230 A | 11/1988 | Mudge |
| 4,819,608 A * | 4/1989 | Filice et al. ............... 124/23.1 |
| 4,837,251 A | 6/1989 | Okay et al. |
| 4,843,104 A | 6/1989 | Melber et al. |
| 4,861,649 A | 8/1989 | Browne |
| 4,897,141 A | 1/1990 | Girard |
| 4,922,596 A | 5/1990 | Wycech |
| 4,931,356 A | 6/1990 | Misevich et al. |
| 4,983,550 A | 1/1991 | Goetz et al. |
| 5,017,629 A | 5/1991 | Wilson et al. |
| 5,019,605 A | 5/1991 | Jannie |
| 5,041,472 A | 8/1991 | Myer |
| 5,075,354 A | 12/1991 | Mitsuuchi et al. |
| 5,098,096 A | 3/1992 | Gentiluomo |
| 5,100,730 A | 3/1992 | Lambers |
| 5,120,769 A | 6/1992 | Dyksterhouse et al. |
| 5,132,356 A | 7/1992 | Siddiqui |
| 5,141,972 A | 8/1992 | Sato |
| 5,158,727 A | 10/1992 | Coleman-Kammula et al. |
| 5,177,124 A | 1/1993 | Questel et al. |
| 5,189,080 A | 2/1993 | Heyke et al. |
| 5,194,459 A | 3/1993 | Sato et al. |
| 5,213,878 A | 5/1993 | Moh et al. |
| 5,217,928 A | 6/1993 | Goetz et al. |
| 5,218,016 A | 6/1993 | Jarrin et al. |
| 5,252,632 A | 10/1993 | Savin |
| 5,278,205 A | 1/1994 | Siddiqui |
| 5,278,221 A | 1/1994 | Siddiqui |
| 5,280,052 A | 1/1994 | Questel et al. |
| 5,308,909 A | 5/1994 | Chen, Sr. et al. |
| 5,336,710 A | 8/1994 | Rao et al. |
| 5,348,990 A | 9/1994 | Walpita et al. |
| 5,354,611 A * | 10/1994 | Arthur et al. ............... 428/325 |
| 5,356,958 A | 10/1994 | Matthews |
| 5,369,147 A | 11/1994 | Mushovic |
| 5,384,345 A | 1/1995 | Naton |
| 5,532,280 A | 7/1996 | Allen et al. |
| 5,532,295 A | 7/1996 | Harrison et al. |
| 5,665,787 A | 9/1997 | Nowak et al. |
| 5,677,045 A * | 10/1997 | Nagai et al. ............... 442/294 |
| 5,691,390 A | 11/1997 | Harrison et al. |
| 5,707,723 A | 1/1998 | Harrison et al. |
| 5,837,739 A | 11/1998 | Nowak et al. |
| 5,846,357 A | 12/1998 | Meteer et al. |
| 5,869,173 A | 2/1999 | Zheng et al. |
| 5,902,755 A | 5/1999 | Driggett et al. |
| 6,171,688 B1 * | 1/2001 | Zheng et al. ............ 428/313.5 |
| 6,180,037 B1 * | 1/2001 | Andersen et al. ............ 264/108 |
| 6,210,715 B1 * | 4/2001 | Starling et al. ............. 424/489 |

* cited by examiner

COMPOSITE MATERIALS

FIELD OF THE INVENTION

The present invention generally relates to composite materials. More specifically, the present invention relates to composite materials having a high density of small particles, such as hollow microspheres, in a matrix material. The present invention also relates to methods of making and using the composite materials, and products made from the composite materials.

BACKGROUND OF THE INVENTION

Composite materials have been used for a variety of applications. Hollow microspheres have also been used as additives to materials. Microspheres have been used as filler materials and additives to paints, plastics, sheet molding compound (SMC), composites, injection molding, adhesives, syntactic foams, and for other applications. However, needs exist for improved composite materials. Furthermore, there are ongoing needs for new materials that have new and enhanced material properties.

Examples of problems with existing composite materials and products made from the materials can include high weight, high cost of the materials, high manufacturing costs, and long manufacturing times. Additional examples of problems have included insufficient heat transfer resistance, poor acoustic properties, poor chemical resistance, poor moisture or water resistance, and inferior electrical properties. Existing composite materials have also been proven marginally cost effective for use as structural members or high strength materials. Desired material properties which have been insufficiently addressed by existing composite materials, include, for example, high strength to weight ratios, hot and cold insulation, high impact and compressive resistance, high flex modulus/stiffness, low specific gravity, chemical stability, sandability, formability, machineability, acoustics, reduced dielectric constant, non-combustible, water resistance, reduced warpage and shrinkage, and the ability to adhere or attach to other materials via conventional hardware or glues. Furthermore, existing composite materials insufficiently combine various desired material properties together into a single material.

There are ongoing needs for improved materials and products made from the materials, such as lighter weight, lower cost, lower manufacturing costs, structural strength, and other properties.

SUMMARY OF THE INVENTION

The new composite materials of the present invention include a matrix material and small particles, such as hollow microspheres. There are a large amount of the small particles relative to the amount of the matrix material such that there is a high-density packing of small particles into the matrix material. The small particles are positioned very close together, and many of the small particles may even be in contact with adjacent small particles. The matrix material fills the interstitial space between the small particles. The composite material can include a greater amount of small particles than matrix material by volume, weight and ratios or percentages of weight and volume.

A Gaussian distribution or random distribution of the small particles occurs in the matrix material by saturating, or nearly saturating, the matrix material with the small particles. The small particles displace the matrix material and create a network structure which provides a remarkably strong material or core. The network structure of the matrix material is a continuous extension of the matrix material around the numerous small particles throughout the composite material. With uniform dispersion of the small particles, the network structure becomes a near perfect uniform distribution of "voids" in the matrix material, in which the small particles form the "voids" in the matrix material. This is particularly the case when microspheres are utilized as the small particles. Although this disclosure often refers to hollow microspheres, it should be understood that the present invention generally pertains to small particles. Forces applied to a device made from the new composite material are distributed by the small particles and matrix material throughout the composite material. Compression of the matrix material and small particles prior to curing can assist in distributing the small particles and removing entrapped air or gases from the composite material structure.

By way of example, a composite material of the present invention may have a composition of approximately 40%–85% microspheres by volume and approximately 15%–60% matrix material (resin) by volume. The composite material can include other components, as desired. Another, more preferred, composite material of the present invention may have a composition of approximately 69%–81% hollow microspheres by volume and approximately 19%–31% matrix material by volume. One preferred composite material of the present invention has a composition of approximately 75% microspheres by volume and approximately 25% matrix material by volume. Another new composite material of the present invention has approximately 3 parts hollow microspheres and 1 part resin, and has a consistency approximately that of clay or pizza dough. Another composite material of the present invention may have a composition of approximately 25%–88% microspheres by volume and approximately 12%–75% matrix material by volume. Other components can be added to the composite material, as desired. For example, the resin matrix material may include additives, mold release agents, inhibitors, thixotropes (thickening agents), and initiators (resin curing catalysts). Further additional components can include, but are not limited to, for example, chopped fiber which would reduce the percent volume amount of the microspheres by the same percent volume amount of chopped fiber added. The new composite materials of the present invention can be used for a wide variety of applications, and can be made by a wide variety of processes.

The compositions of various examples of new composite materials are described in relative amounts of the components by weight. This is because the desired amounts of the basic component materials (matrix material and small particles) are easily taken from bulk storage by weighing the components. Accordingly, for any given components, the relative weight amounts of the components can be used to describe the composition. However, the relative volume amounts of the components (small particles and matrix materials) can be used to describe composition. This is because the desired dense packing of the small particles in the matrix materials is dependent on the relative volumes of the components and not necessarily their weights.

Another example of the present invention includes Scotchlite™ K46 glass bubbles available from 3M™ and polyester resin. The composite material included from about 38% to about 41% microspheres by weight of the composite material and from about 72% to about 59% by polyester resin by weight of the composite material. The microspheres occupy a greater space of volume in the composite material than the resin. The weight amounts of the microspheres and resin change depending on the molecular weights of these components, for example, the weight percent of the microspheres can be greater than the weight percent of the matrix material and vice versa. These weights in this example are for the core composite material only (matrix material plus microspheres) and do not include any additional components, such as flanking fiber (glass, aramid, or carbon fiber).

The new composite materials provide remarkable improvements in material properties, such as dramatically reducing the weight of composite materials while increasing some material properties strength. The density packing of the hollow microspheres in the matrix material provides a network structure, and due to tangential pressures being exerted from one microsphere to the next along random paths in all directions, the composite materials exhibit remarkable strength and other properties. In one process of making the new composite material, a matrix material and microsphere mixture is compressed and excess matrix material is passed through a filter and removed. The microspheres are retained in the matrix material and positioned very close together in random Gaussian distribution to form a high-density packing of the microspheres.

Another process for making the new composite material includes mixing small particles and matrix material together until the small particles are evenly distributed in the matrix material.

The technology of the present invention also pertains to products having, and processes for, encapsulation of densely packed small particles, for example microspheres, glass/ceramic spheres, or microballoons, with matrix materials. Examples of matrix materials include, but are not limited to, resins in general, epoxies, polyesters, vinyl esters, phenolics, thermoplastics, thermosets, polyurethanes, glues, cements, super glue, Elmers™ glue, and other binder materials. The products and processes may include additional materials, for example, without limitation, materials mixed in the matrix material, flanking materials, fibers, carbon fibers, glass fibers, aramid fibers, laminates, and other materials.

The technology of the present invention also pertains to products having, and processes for, encapsulation of materials with matrix materials inside of containers by using vacuum pressure for infusion of the matrix materials into the containers. For example, a low-level (non-intense) vacuum pressure may be used for the infusion process. Positive pressure may also be used to assist with infusion of the matrix materials into the containers. Examples of the encapsulated materials include, but are not limited to, tiles, ceramic tiles, fibers, woven and non-woven fibers, carbon fibers, glass fibers, cloth fibers, and other materials. Examples of matrix materials include, but are not limited to, resins in general, epoxies, polyesters, vinyl esters, phenolics, thermoplastics, thermosets, polyurethanes, glues, cements, super glue, Elmers™ glue, and other binder materials. Small particles, for example microspheres or microballoons, may be included with the encapsulated materials.

Objects and advantages, which may be desired, but not necessarily required to practice the present invention, can become apparent from reading this disclosure with reference to the accompanying drawings, and the appendant claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF PRESENTLY PREFERRED EMBODIMENTS

Although the present invention can be made in many different forms, the presently preferred embodiments are described in this disclosure and shown in the accompanying drawings. This disclosure exemplifies the principles of the present invention and does not limit the broad aspects of the invention only to the illustrated embodiments.

Generally, the composite materials of the present invention include a matrix material and a plurality of small particles. The matrix material contains a high density of the small particles. Because of the high density of small particles in the matrix material, the small particles are positioned very close to each other. Adjacent small particles may even be in contact with each other. Typically, the composite material includes a greater volume amount of small particles than the volume amount of matrix material. For example, one new composite material has about twice as much small particles as matrix material by volume.

A preferred embodiment of the present invention is to provide a layered structure having a core of the composite material (microspheres and resin) with fiber flanking on one or both sides of the core. The layered structure or sandwich can have any desired shape, such as a flat shape, a bar shape, or a contoured shape. The composite material core with fiber flanking provides remarkable strength and is very light weight.

One composite material of the present invention may have a composition of approximately 40%–85% microspheres by volume and approximately 15%–60% matrix material (resin) by volume. The composite material can include other components, as desired. Another, more preferred, composite material of the present invention has a composition of approximately 69%–81% hollow microspheres by volume and approximately 19%–31% matrix material by volume.

One preferred composite material of the present invention has a composition of approximately 75% microspheres by volume and approximately 25% matrix material by volume. Another new composite material of the present invention has approximately 3 parts hollow microspheres and 1 part resin, and has a consistency approximately that of clay or pizza dough. Another composite material of the present invention may have a composition of approximately 25%–88% microspheres by volume and approximately 12%–75% matrix material by volume. Other components can be added to the composite material, as desired. For example, the resin matrix material may include additives, mold release agents, inhibitors, thixotropes (thickening agents), and initiators (resin curing catalysts). Further additional components can include, but are not limited to, for example, chopped fiber which would reduce the percent volume amount of the microspheres by the same percent volume amount of chopped fiber added.

This disclosure often refers to microspheres or hollow microspheres for convenience; however, it should be understood that the present invention generally pertains to small particles and is not limited to microspheres. The small particles of the present invention can include particles having different sizes and different shapes, such as spherical, elliptical, or any other shapes. The small particles can be hollow, solid, or contain other materials inside, or can be coated outside, if desired. The small particles are preferably non-porous; but may be porous if desired.

Figure 1:
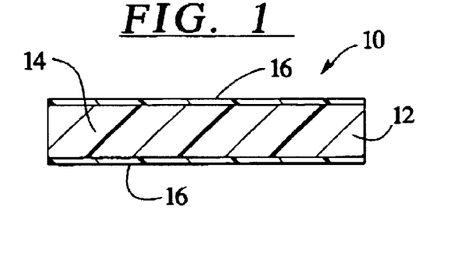
FIG. 1 is a cross-sectional view of a device having a composite material according to the principles of the present invention.

FIG. 1 of the drawings shows one new device 10 having a new core composite material 12 according to the present invention. The core composite material 12 includes a matrix material and a plurality of hollow microspheres. The microspheres are densely packed in the matrix material such that the microspheres are positioned relatively close together. Additional materials may be included within the composite material 12 or on the outside of the composite material 12. The core composite material 12 has a greater amount of microspheres by volume than the amount of matrix material by volume. The matrix material may be saturated or nearly saturated with microspheres.

The composite material 12 can be formed into any desired shape prior to curing or hardening. Also, the composite material 12 can be machined after hardening, if desired. Accordingly, vast varieties of products can be made from the new composite material 12. Prior to hardening of the matrix material to form the composite material 12, the matrix material and microsphere mixture may have a consistency similar to clay, pancake batter, or dough, for example. The consistency of the uncured composite material, i.e. the relative amounts of microspheres and matrix material, will vary depending on various factors. For example, more or less microspheres may be added to the composite material to respectively increase or decrease the strength of the cured material. Similarly, the amounts of the microspheres and matrix material can be varied to obtain resultant material properties. The viscosity of the uncured composite material may also be adjusted depending on the particular manufacturing method used to make products from the composite material. The uncured composite material may have a lower viscosity for infusion molding and a higher viscosity for cold forming, for example. Additionally, the matrix material may be in the form of powdered resins or pellets of plastic or other matrix materials.

The device 10 shown in FIG. 1 has a core 14 made from the composite material 12, and flanking material 16 on top and bottom sides of the core 14. The flanking material 16 can be on one, both, or neither of the top and bottom sides of the core 14. The flanking material 16 can be positioned inside the structure with the core 14 being on either side or surrounding the flanking material 16. The flanking material 16 can be a single layer, staggered layers, multiple layers, and can be made of a single type of material or a variety of materials, as desired. The matrix material penetrates into the fiber flanking 16 to wet-out the fiber flanking 16 and bond the flanking material 16 to the core 14. Penetration of the matrix material and the microspheres into the flanking material 16 occurs prior to hardening of the fluid composite material into the composite material 12. The device 10 of FIG. 1 has a flat board shape, with flanking material 16 on both the top and bottom sides of the core 14. As a result, device 10 has a "sandwich" shape. Examples of suitable flanking materials 16 include, but are not limited to, carbon fibers, glass fibers, uni-directional fibers, cross-woven fibers, matte fibers, fiber braid, uni-directional stitch woven carbon fiber braid, carbon or other felt, plastics, leathers, foils, metals, composites, thermoplastics, thermoset materials, resins, ceramics, vinyls, rigid materials, flexible materials, and any other desired material.

Figures 2, 10, 11:
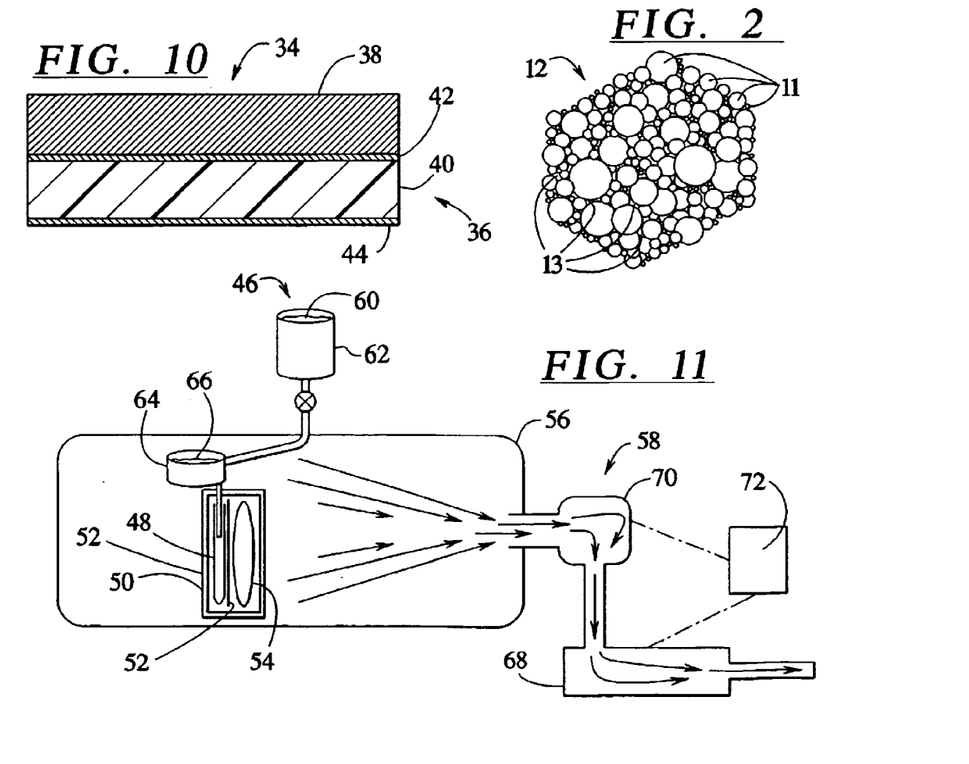
FIG. 2 is an enlarged schematic perspective view of a portion of the composite material of FIG. 1.
FIG. 10 is a cross-sectional view of another device having a composite material according to the present invention.
FIG. 11 is a schematic diagram of a system for making a composite material according to the present invention.

FIG. 2 shows an enlarged portion of the composite material 12 of the core 14. The hollow microspheres 11 are positioned in contact with each other, i.e. adjacent microspheres 11 are touching one another, or are only slightly spaced away from each other. The microspheres 11 are nested in Gaussian distribution such that smaller diameter microspheres 11 fill areas between larger diameter microspheres 11. Adjacent microspheres 11 are positioned relatively close to each other and some may even be in contact with each other. Matrix material fills the interstitial space areas 13 between adjacent icrospheres 11 and creates a network structure. Adjacent microspheres 11 which are not in contact with each other, the matrix material fills the volume of spaces 13 between the microspheres 11. In a preferred distribution of microspheres, substantially any given distance between adjacent microspheres is less than the diameter of the smallest microsphere.

Referring to FIGS. 1 and 2, the matrix material of the composite material 12 can be any matrix material suitable for the intended purpose of the device 10. Examples of matrix materials include, but are not limited to, resins in general, epoxies, polyesters, vinyl esters, phenolics, thermoplastics, thermosets, polyurethanes, glues, cements, super glue, Elmers™ glue, and other binder materials. Generally, the matrix material and the microspheres are mixed together, with any other additive components, and cured or hardened into a desired shape. The hollow microspheres are densely packed close together in the matrix material before hardening of the matrix material. The matrix material fills the spaces between adjacent microspheres. The matrix material can effectively become saturated or nearly saturated with microspheres to achieve the dense packing. Examples of making the composite material (matrix material and microspheres) are discussed below. Examples of additives to the matrix material include, but are not limited to, accelerators, promoters, catalysts, degassing agents, and cross-linking agents.

The hollow microspheres useable with or within the composite material 12 are commercially available in a variety of sizes, materials, and properties. Examples of some existing hollow microspheres useable with the present invention are available from 3M™ and Zeelan Industries, Inc. under the trade names 3M™ Scotchlight™ glass bubbles, 3M™ Scotchlight™ glass bubbles floated series, 3M™ Z-Light™ Spheres microspheres, and 3M™ Zeeospheres™ microspheres. The microspheres can be made from a variety of materials, for example glass, ceramic, or plastic. The microspheres may be surface treated, coated, or colored, as desired. The microspheres used in the composite material 12 preferably have different sizes (outer diameters), for example from about 15 microns to about 120 microns. Hollow microspheres typically range from about 1 micron to about 350 microns in outer diameter, and may be used in the present invention, although other diameters and shapes may also be used in the new composite materials as well. The different sized microspheres allows for smaller microspheres to fill-in spaces between larger microspheres. Thus, a greater packing density of the microspheres in the matrix material is achieved. When being mixed into the matrix material, the microspheres act as small ball bearings when they contact each other, and thus, tend to randomly distribute large and small diameter microspheres among each other to optimize packing density and minimize voids between microspheres. Microspheres can be purchased with a variety of wall thicknesses, and can be measured by their crush strength ranging from 250 to 60,000 psi. The packing density of the microspheres in the matrix material remains approximately the same regardless of the microsphere crush strength. Other examples of microspheres are commercially available from The PQ Corporation.

The composite material 12 may include additional components other than the microspheres and the matrix material. Additional components can include, but are not limited to, glass fibers, carbon fibers, aramid fibers, chopped fibers, reinforcement fibers, long fibers, wire braid, fibers for open or closed pore products, resins, liquids, solids, and any other suitable additives. By way of example, other components can also include calcium carbonate or barium sulfate as a filler, zinc stearate as a mold releasing agent, perlite (insulation material), degassing agents, blowing agents, conductive materials, powdered metals, lost-wax for worm-hole cooling, tubing, hardware inserts, and surface inserts (glass, veneer, etc.).

A Nikon SMZ-U stereo microscope with a Polaroid digital camera system was used to take photographs of example composite materials according to the present invention and a photograph of microspheres alone. The photographs of FIGS. 3–6 were taken by the Nikon and Polaroid camera and microscope system. Due to the high intensity fiber optic lighting used in the Nikon SMZ-U stereo microscope with the Polaroid digital camera system, glare on a machined surface of the composite material overpowers the ability to actually see the surface. By staining or dying the surface, the "glare" is reduced dramatically.

Figure 3:
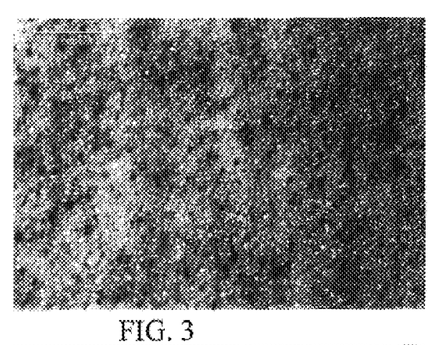
FIG. 3 is a color photograph of a composite material according to the present invention under magnification and stained with a black dye.

FIG. 3 is a color photograph of a composite material according to the present invention. The composite material of this example includes 3M™ Scotchlite™ K-46 microspheres which are clear and off-white epoxy resin as the matrix material. The composite material was black stained to show a contrast between the matrix material and the microspheres.

A black Ritt™ dye was used on the surface of the sample of the composite material and wiped clean with acetone. After wiping the surface of the composite material with acetone, the dye is left in the "pits" of the surface to show some exterior tracings of transparent microspheres. The surface pits are broken or collapsed hollow microspheres due to cutting a slice of the composite material for viewing under the stereomicroscope. The surface pits are highly magnified in FIG. 3 which creates an impression when viewing FIG. 3 that the pits (black stained areas) are much larger voids than are actually present. The dense packing of the microspheres in the matrix material is shown in FIG. 3. The sizes of two microspheres are measured as 41.889 µm and 26.538 µm. Also, a reference line of 500 µm is provided in FIG. 3.

Figure 4:
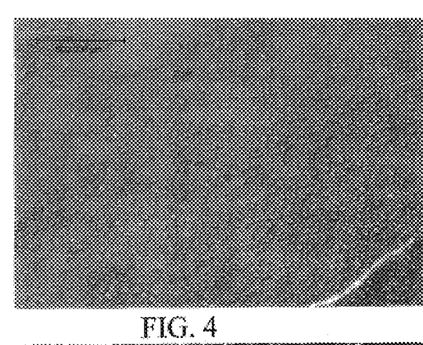
FIG. 4 is a is a color photograph of a composite material according to the present invention under magnification and stained with a green dye.

FIG. 4 is a color photograph of another composite material according to the present invention. The composite material of this example includes 3M™ Scotchlite™ K46 glass microspheres and polyester resin as the matrix material.

The composite material was green stained to show the microspheres in the matrix material. The green stain used in this sample is a sublimation dye, a heat transfer dye that sublimates above 375–400° F. The dry dye was placed close to the composite material sample and heated to vaporize the dye that contacts and stains the composite material. The microscope has a relatively shallow depth of field—under 20 microns. The depth of field limits the ability to photograph all of the microspheres in focus. However, the larger microspheres which are clearly visible measure approximately 27–37 microns. A reference line of 500 µm is also provided in FIG. 4. Although not clearly visible in the photograph of FIG. 4, smaller microspheres are closely packed in the matrix material between the larger, visible microspheres.

Figure 5:
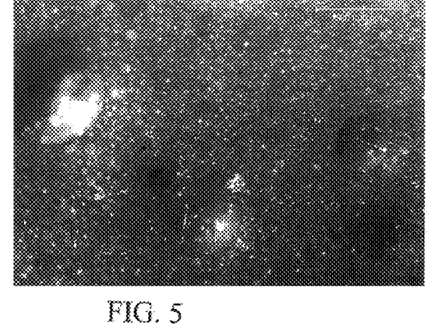
FIG. 5 is a is a color photograph of a composite material according to the present invention under magnification and stained with a red dye.

FIG. 5 is a color photograph of another composite material according to the present invention. The composite material of this example includes 3M™ Scotchlite™ K-46 microspheres and polyester resin as the matrix material. The composite material sample of FIG. 5 has the same composition as the compositions of the composite material samples of FIGS. 3 and 4.

The composite material was stained red and a greater magnification of the microscope was used to even more clearly show the dense packing of the microspheres in the matrix material. The red stain used in this sample is sublimation ink. A reference line of 500 µm is also provided in FIG. 5.

Figure 6:
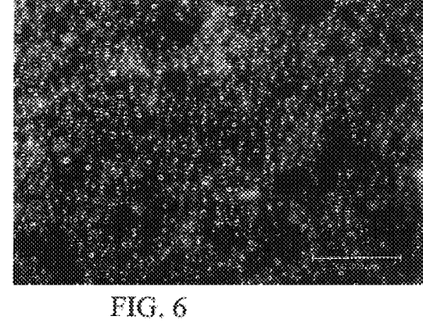
FIG. 6 is a color photograph of microspheres under magnification on a glass slide.

FIG. 6 is a color photograph of microspheres alone under magnification on a glass slide. The transparent microspheres were dusted on a clear glass slide and placed in the microscope. A black background was used to help illuminate the microspheres.

Figure 7:
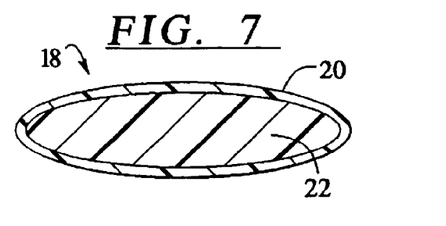
FIG. 7 is a schematic diagram of a device having a composite material according to the present invention.

FIG. 7 is a schematic diagram of a device 18 having an outer rigid structure 20 with a hollow interior. The interior of the rigid structure 20 is filled with a composite material according to the present invention to form a core 22 of the composite material. The composite material (microspheres and matrix material) can be infused into the outer rigid structure 20 to form the core 22. The microspheres are densely packed in the matrix material such that the microspheres are positioned very close together. For example, some adjacent microspheres may be in contact with each other and other adjacent microspheres are slightly spaced away from each other.

The device 18 schematically shown in FIG. 7 could have any desired shape defined by the outer rigid structure 20. The outer rigid structure 20 may initially be formed from a flexible material, which then becomes more rigid. For example, a flexible material could be used for the outer structure 20, which becomes more rigid when the core of composite material 22 hardens.

Figure 8:
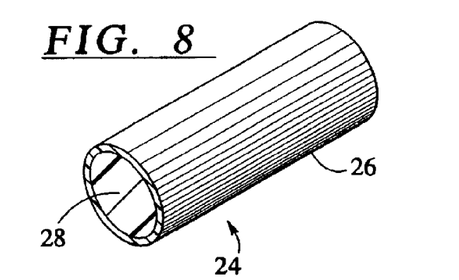
FIG. 8 is a perspective view of another device having a composite material according to the present invention.

Another example of a device according to the present invention is shown in FIG. 8. The device 24 has a rigid outer tube 26 and a core of composite material 28 infused into the interior of the outer tube 26. The core of composite material 28 includes a matrix material and microspheres densely packed in the matrix material. As with all embodiments of the composite material of the present invention, other components may be included in the composite material. The rigid outer tube 26 of the device 24 has a round shape in cross-section, but could have any desired cross-sectional shape.

Figure 9:
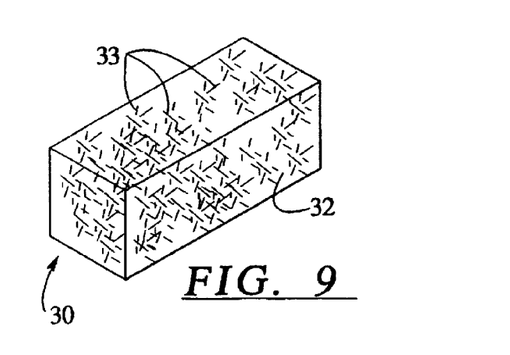
FIG. 9 is a perspective view of another device having a composite material according to the present invention.

Another device 30 made of composite material 32 having a matrix material and microspheres is shown in FIG. 9. The device 30 does not include an outer structure like the device 18 shown in FIG. 7. Rather, the composite material 32 can be molded into a desired configuration. The configuration of the device 30 could also be formed by reshaping the matrix material after it has hardened, for example, by machining. The rectangular shape of the composite material 32 shown in FIG. 9 is merely exemplary, and of course, the composite material could be used to achieve any desired shape. FIG. 9 also shows short chopped fiber 33 as an example of optional additives included in the composite material 32.

FIG. 10 shows yet another example of a device 34 having the new composite material. The device 34 has a backer plate 36 attached to a layer of material 38. The backer plate 36 has a layer of the composite material 40 and optional flanking material layers. Flanking material layers 42, 44 may be provided on one, both or none of the opposite sides of the layer of composite material layer 40. The backer plate 36 attached to the layer of material 38 can provide advantages for the device 34 as compared to the layer of material 38 without the backer plate 36. For example, the backer plate 36 having the composite material layer 40 provides increased strength to fragile or brittle materials, such as marble, ceramic, glass, stone, and other fragile materials.

EXAMPLES OF MATERIAL PROPERTIES OF THE COMPOSITE MATERIAL

The composite material of the present invention having a high density of small particles, such as microspheres, in a matrix material provides new, remarkable material properties. Also, the following examples of the composite material include a layered structure of a core of composite material (matrix material and microspheres) and fiber flanking on both sides of the core. The composite material core has a close packing of microspheres in the matrix material. The close packing of microspheres with matrix material filling the interstitial space between microspheres provides the core with remarkable three dimensional strength. The addition of fiber flanking to the composite core increases the strength further.

Material properties of the composite material which have been found to be greatly improved over material properties of existing composite materials and other materials include, for example, heat transfer resistance or insulation, strength to weight ratios, impact and compressive properties, flexural modulus (stiffness), specific gravity and true density, acoustic properties, conductive properties, ease of machineability, high impact resistance, attachability, and radio/microwave shielding. Further remarkable properties of the new composite material include, chemical and corrosion resistance, sandability, reduced dielectric constant, reduced warpage and shrinkage, water resistance, weight reduction, hardness, and abrasion resistance. These material properties of the present invention also include the ability to mold devices (e.g., automobile fenders, doors, and trunks) from uncured composite material and then cure the molded part.

Test Samples

Various sample plaques of the new composite material were made and tested. The sample plaques have a flat, layered structure of a core of the composite material (resin and microspheres) and fiber flanking on both sides of the core (see FIG. 1). The test results provided below show that the composite material structure has remarkable strength. All samples in Batches 1–4 have a 5/16" thickness, including the core and the fiber flanking. The specific gravity of the microspheres ranged from about 0.12–2.40, depending on the specific microsphere. The binder resins also included the additives of a catalyst, an inhibitor, and a mold release agent.

The compressive strength of the sample plaques was measured in two directions, horizontal and vertical. The horizontal compressive strength was measured with the plaques in a horizontal position, i.e., the force was applied perpendicular to the face of the plaque. The vertical compressive strength was measured with the plaques in the vertical position, i.e., the plaques were standing on edge and the force was applied to the end of the sample parallel to the face of the plaques.

All Batch 1 sample plaques included polyester resin as the matrix material.

BATCH 1

| Sample | IZOD (ft-lbs/inch of sample thickness) | Flexural Strength (psi) | Flexural Modulus (psi) | Compressive Strength | |
|---|---|---|---|---|---|
| | | | | Horizontal (psi) | Vertical (psi) |
| 1—3M K46 microspheres; 46K lineal carbon fiber | 20.5 | 22,690 | 4,813,000 | 44,890 | 20,720 |
| 2—3M K46 microspheres; 48K lineal carbon fiber | 16.4 | 19,100 | 3,863,000 | 48,270 | 20,630 |
| 3—3M K46 microspheres; Owens Corning A260 lineal glass fiber | 25.2 | 18,690 | 2,414,000 | 54,070 | 24,910 |
| 4—PQ Corp. SG ceramic microspheres, xylene coated; 46K lineal carbon fiber | 26 | 27,790 | 4,851,000 | 15,690 | 6,424 |
| 5—PQ Corp. SG ceramic microspheres, uncoated; 46K lineal carbon fiber | 26 | 18,100 | 4,365,000 | 7,779 | 5,858 |
| 6—3M W1300 ceramic microspheres; 46K lineal carbon fiber | 13.5 | 21,740 | 4,510,000 | 17,400 | 8,450 |
| 7—3M K1 microspheres; 46K lineal carbon fiber | 15.9 | 16,310 | 4,568,000 | 13,270 | 5,624 |

Batch 2, samples 1–6, 8, 10, 11, and 13 include polyester resin, and samples 7, 9, 12, and 14 include vinyl ester resin. All Batch 2 samples 1–14 include PQ Corp. SG ceramic microspheres, xylene coated. Batch 2, samples 1–8 have a 1" width, and samples 9–14 have a 0.5" width.

BATCH 2

| Sample | IZOD (ft-lbs/inch of sample thickness) | Flexural Strength (psi) | Flexural Modulus (psi) | Compressive Strength Horizontal (psi) | Compressive Strength Vertical (psi) | Young's Modulus (psi) |
|---|---|---|---|---|---|---|
| 1—Owens Corning A260 lineal glass fiber | 13.3 | 25,330 | 2,305,000 | 23,880 | 8,843 | 2,282,000 |
| 2—46K lineal carbon fiber | 11.9 | 31,660 | 3,797,000 | 30,140 | 13,610 | 694,000 |
| 3—46K lineal carbon fiber | 10.5 | 33,600 | 4,189,000 | 24,680 | 8,190 | 4,179,000 |
| 4—48K lineal carbon fiber | 11.7 | 25,540 | 3,231,000 | 22,830 | 6,865 | 3,418,000 |
| 5—48K lineal carbon fiber | 47.7 | 29,790 | 4,056,000 | 29,930 | 12,170 | 4,039,000 |
| 6—46K lineal carbon fiber | 8 | 34,150 | 3,744,000 | 24,680 | 6,190 | 3,551,000 |
| 7—46K lineal carbon fiber | 13.4 | 40,250 | 3,430,000 | 29,820 | 13,860 | 3,581,000 |
| 8—46K lineal carbon fiber | 8.1 | 13,170 | 1,058,000 | 19,670 | 10,660 | 1,085,000 |
| 9—46K lineal carbon fiber | 10.2 | 12,880 | 845,000 | 29,820 | 13,860 | 900,000 |
| 10—48K lineal carbon fiber | 14.7 | 28,090 | 5,247,000 | 29,930 | 12,170 | 5,463,000 |
| 11—46K lineal carbon fiber | 8 | 34,350 | 4,688,000 | 19,670 | 10,660 | 4,783,000 |
| 12—46K lineal carbon fiber | 10.2 | 39,990 | 4,861,000 | 29,820 | 13,860 | 4,929,000 |
| 13—46K lineal carbon fiber | 8.1 | 15,930 | 1,728,000 | 19,670 | 10,660 | 1,770,000 |
| 14—46K lineal carbon fiber | 10.2 | 15,380 | 1,972,000 | 29,820 | 13,860 | 2,152,000 |

All samples 1–14 in Batches 3 and 4 were made with polyester resin as the matrix material and PQ Corp. SG ceramic microspheres, xylene coated. Batches 3 and 4, samples 1–6 and 8–14 have single ply lineal carbon fiber flanking, and sample 7 has two-ply lineal carbon fiber flanking on both sides. The veils are facing each other for each two-ply carbon fiber flanking in sample 7.

The hollow microspheres at a high density in the matrix material provides a near-perfect thermal insulator. The composite material structure protects the otherwise fragile epoxy from significant degradation due to the intense heat by isolating the extreme temperatures at or nearby the surface of the structure. This is important as most epoxies or resins significantly degrade when exposed to prolonged high heat

BATCHES 3 AND 4

| Sample | IZOD (ft-lbs/inch of sample thickness) | Flexural Strength (psi) | Flexural Modulus (psi) | Compressive Strength Horizontal (psi) | Compressive Strength Vertical (psi) | Young's Modulus (psi) |
|---|---|---|---|---|---|---|
| 1—46K lineal carbon fiber, veil out | 17 | 38,100 | 5,194,000 | 30,980 | 11,730 | 5,580,000 |
| 2—46K lineal carbon fiber, veil out | 12.4 | 39,090 | 3,773,000 | 25,430 | 13,890 | 3,660,000 |
| 3—46K lineal carbon fiber, no veil | 10.7 | 14,540 | 2,327,000 | 35,630 | 13,850 | 2,424,000 |
| 4—Owens Corning A260 lineal glass fiber, no veil | 14.6 | 32,000 | 1,772,000 | 24,130 | 13,930 | 1,971,000 |
| 5—46K lineal carbon fiber, veil out | 18.3 | 38,520 | 3,639,000 | 30,070 | 13,630 | 3,994,000 |
| 6—46K lineal carbon fiber, veil out | 9.5 | 40,540 | 3,654,000 | 39,560 | 13,330 | 3,847,000 |
| 7—46K lineal carbon fiber, 2-ply | 19.2 | 59,090 | 4,896,000 | 30,850 | 18,440 | 5,563,000 |
| 8—48K lineal carbon fiber, veil in | 16.1 | 34,870 | 3,597,000 | 39,790 | 16,170 | 3,650,000 |
| 9—46K lineal carbon fiber, veil out | n/a | 40,360 | 2,713,000 | 41,060 | 17,610 | 4,235,000 |
| 10—46K lineal carbon fiber, veil in | n/a | 39,190 | 4,198,000 | 41,160 | 18,510 | 4,204,000 |
| 11—46K lineal carbon fiber, veil out | n/a | 26,580 | 3,825,000 | 32,470 | 17,450 | 3,964,000 |
| 12—46K lineal carbon fiber, veil in | n/a | 29,720 | 3,607,000 | 38,060 | 19,070 | 3,712,000 |
| 13—46K lineal carbon fiber, veil out | n/a | 30,970 | 3,371,000 | 44,060 | 17,910 | 3,395,000 |
| 14—46K lineal carbon fiber, veil in | n/a | 34,680 | 3,371,000 | 42,760 | 19,350 | 3,391,000 |

Heat Resistance

The new composite materials exhibit remarkable heat transfer resistance properties. A test sample plaque made of the composite material was subjected to heat transfer testing. The composite material of the test sample plaque included Ciba two-part epoxy resin #8601 as the matrix material with 3M™ Scotchlite™ K-46 glass bubbles as the hollow microspheres. The test sample plaque had a wall thickness of 5/16" of the composite material.

A hand-held blow dryer having outlet temperatures of about 758° F. was held close to a front side of the composite material plaque for prolonged periods of time such that the front side of the plaque reached a temperature of about 758° F. There was no significant temperature rise on the backside (opposite side) of the plaque. The backside of the composite material plaque remained approximately at room temperature, and was comfortable to the touch.

such as the heat generated by the hand-held blow dryer. Phenolic resins are preferred for extreme temperature applications, both high and low temperatures, over epoxy, and will provide even greater performance than the sample epoxy based composite material tested.

As a comparison to the composite material test plaque, the same epoxy without microspheres was also tested as a plaque in the same fashion. The plaque having epoxy alone turned into a rubbery material and then began to chemically breakdown fairly rapidly under the intense heat. While there are many high temperature resins that are formulated for high temperature applications, the composite material of the present invention significantly improves heat transfer resistance performance, and also reduces the weight of the material for high temperature applications.

To further exemplify the insulative properties of the composite material, a prototype carafe was made with an approximate ½" wall thickness and a 1" piece of Celotex™ insulative board was placed on top of the container as a sealing lid. The composite material carafe included Ciba two-part epoxy resin #8601 as the matrix material with 3M™ K46 Scotchlite™ glass bubbles as the hollow microspheres. A Thermos™ bottle with a lid (a double chrome walled bottle with vacuum between the walls) was used for comparative purposes and a third plastic container was used as a control, specifically a high-density polyethylene (HDPE) bucket.

Figure 12:
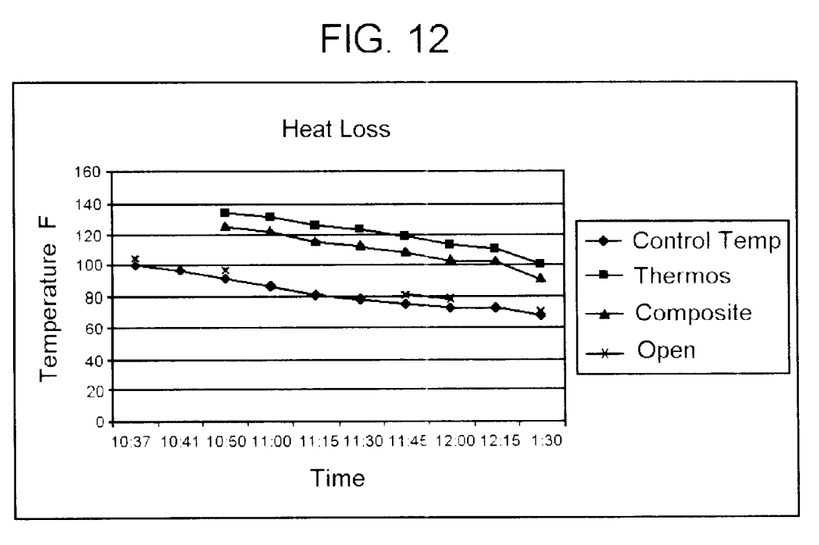
FIG. 12 is a graph showing comparative results of water temperature loss for three vessels.

Each vessel was filled with eight ounces of 154° F. water. The containers were at about 70° F. ambient temperature and were not preheated prior to filling with the water. A digital thermometer was used for temperature readings of the water in all of the vessels. Temperature readings were periodically taken over a 3-½ hour time period. The composite material carafe when compared to the Thermos™ bottle performed similarly, i.e. had similar temperature loss. The thin wall of the Thermos™ bottle caused minor temperature loss when compared to the thicker wall composite material carafe. Referring to FIG. 12, the temperature data and graph show the comparative results of the water temperature loss test for the three vessels.

Another example of the remarkable heat transfer resistance properties of the new composite material, a sample composite material was tested for maintaining liquid nitrogen at a very low temperature. Sample containers of the new composite material were made having a thickness of 3". The composite material containers contained Ciba two-part epoxy resin #8601 as the matrix material with 3M™ K1 glass spheres as the hollow microspheres. Liquid nitrogen at about −328° F. was placed inside the composite material container. The temperature of the liquid nitrogen was measured for a time period of 8 hours. A temperature probe was located at the outside bottom of the composite material container for the 8-hour test period. The temperature probe permits dual probe monitoring and ambient room temperature of 70° F. was observed (plus or minus about 4° F.). The outside bottom of the container also contained a probe. During the 8-hour test, there was no variation in the temperature difference between the inside and outside container probes. Also, liquid nitrogen was still present in the container, which remained at a constant temperature of −328° F. Remarkably, there was no reduction in the temperature of the outside container probe due to the insulation of the composite material container.

It is believed that the microsphere rich composite material will not support combustion and is self-extinguishing when a flame is applied to the material and then removed.

Strength to Weight Ratios

The new composite material also exhibits remarkable strength to weight ratio properties, which means the composite material has a high degree of strength and a low weight. The structure of the composite material having the matrix material with a high density of microspheres enables the improved strength to weight properties.

In the use of carbon fiber, glass fiber, aramid fibers, natural or and other high strength materials to make a product part, the basic approach is to layer many layers of pre-woven-resin impregnated material over a mold or form. The mold is closed, clamped, and heated in an autoclave. In the case of pre-impregnated material, the layers are subjected to about 75-psi pressure inside an autoclave. A single part polyester resin is heat-activated (typically above 200° F.) and the part is held for a period of time to void out trapped air and cure the part. This process is slow and the autoclave is very expensive. For most applications (e.g., a truck hood or body panel) to achieve stiffness and impact resistance, many layers of cloth are required or high loadings of random fibers are added the matrix material to make the part, such as SMC (Sheet Molding Compound). This ultimate sandwich of layers or high loaded resin compound results in a relatively heavy part when compared to the same product part made from the new composite material having densely packed microspheres mixed into the matrix material. When the microspheres of the new composite material are permitted to infiltrate the woven fiber fabric, the ultimate weight of the part is further reduced as pure resin is displaced by the lighter microspheres. This also helps stabilize the fiber alignment within the matrix material permitting side loading and less internal sheer of adjacent fibers when subjected to external stress.

An aluminum die cast seat lifter arm used for tilting of a truck seat (two lifter arms per seat, each pivotal at one end around a pivot pin inserted into a hole in the lifter arm) was duplicated using the new composite sandwich material and eliminated about 68% of the gross weight of the part with dramatic strength increases (about 550% above the strength requirement for the lifter arm) over its aluminum counterpart. The composite material seat lifter arm included Ciba two-part epoxy resin #8601 as the matrix material with 3M™ K46 Scotchlite™ glass bubbles as the hollow microspheres. The composite material lifter arm was flanked on both sides with commercial grade cross-woven carbon fiber with 90° fiber orientation and 46K carbon fiber. It is believed that the microspheres at a high density in the matrix material serve as spherical voids creating a near-perfect network structure in the matrix material. The network structure is far superior to the aluminum, titanium, or nonferrous counterparts of honeycomb board. It is believed the compressive strength of the new composite material is derived from the network structure of the matrix material with the high-density packing of microspheres and not from the microsphere crush strength alone. Accordingly, utilizing the lightest microspheres may be desired for maximizing the ultimate structural strength to weight properties.

The remarkable strength of the new composite material is particularly great when the composite material is side-loaded with a force. Referring to FIG. 1, side loading is applying a force perpendicularly to the drawing sheet, i.e. the force is applied to the side of the composite material showing the cross-section rather than applied to the face of the flanking layer 16. The composite material core 14 serves as a spacer between the fiber flanking layers 16. The composite material core 14 saturates (wets out) the fiber flanking layers 16 during the manufacturing process. The composite material core 14 which penetrates the flanking material 16 between the fibers locks the fibers in there orientation (such as a linear orientation) and protects each fiber in the fiber bundles against chafing or breakage when loaded with forces.

Impact and Compressive Properties

The new composite material also exhibits remarkable impact and compressive properties. Several 5/16" thick composite material bar samples having 46K lineal carbon fiber flanking were made. The composite material included AOC polyester E-920 resin as the matrix material with PQ -SG silane coated ceramic microspheres, and a carbon fiber flanking layer was provided on both sides of the samples. By weight, the core included 48% microspheres and 52% resin. Test results for this bar showed a 26 unnotched IZOD impact rating; 27,790 flexural strength; 4,851,000 flexural modulus, and 15,690 compressive strength.

Another sample composite material board was made with a hole drilled through it and bolted to a 2-½" angle iron bracket with a ⅜" bolt. The composite material core included 39% by weight 3M™ K46 microspheres and 61% by weight resin. Flanking fiber was additional. The sample board was clamped tightly in a bench vice with approximately 2-½' of the angle iron extending outward as a lever. Full body pressure was exerted on the angle iron lever in attempts to break the bolted structure. The composite remained intact and did not fracture. Also, the clamping ⅜" bolt has not loosened during approximately the past six months, demonstrating the extremely high compressive properties of the new composite material.

It should be noted, that traditional honeycomb board is very difficult to attach or clamp to other structures due to the significant spacing of the honeycomb material within the sandwich construction. Existing honeycomb boards tend to easily compress when clamped to another structure, and will further compress over time, which results in a loosening of the clamped assembly. Supporting inserts have been added to existing honeycomb structures in attempts to improve crush strength. However, this significantly increases the cost of the honeycomb board and replacing retrofitting non-insert honeycomb board with honeycomb board having supporting inserts can be difficult. Boards made from the new composite material are inexpensive, do not require supporting inserts, and are easy to use, such as installing floorboards made from the composite material by riveting, bolting, or gluing.

Inserting a piece of the new composite material "sandwich" into a bench vice and tightening the vise with an intense force does not crush the composite material nor does the composite material crumble as would be expected with existing composite materials. The composite material included Ciba two part epoxy resin #8601 as the matrix material with 3M™ K46 Scotchlite glass bubbles as the hollow microspheres, and a 46K lineal carbon fiber flanking layer was provided on both sides of the samples. The composite material core included 39% by weight 3M™ K46 microspheres and 61% by weight resin. Additionally, forcefully striking the same new composite material board with a hammer will not noticeably affect the structure. Such properties are most unusual for composite materials as they normally catastrophically fail when struck, bolted to other structures, or forcefully compressed without including special design accommodations. Furthermore, the new composite material can be easily machined using traditional woodworking equipment including sanding, drilling, and cutting.

Flexural Modulus (Stiffness)

The new composite material also exhibits remarkable flexural modulus (stiffness) properties. Pallets are one example of a product that shows the remarkable enhanced stiffness provided by the new composite material. Existing pallets have been manufactured using plastics. However, plastic pallets have included additional reinforcement materials for heavy-duty applications. One existing plastic pallet includes square ⅛" wall aluminum tubes (1"×1"×40") as reinforcement inserts to meet government & grocery market specifications. Each pallet requires five aluminum tubes that cumulatively weigh about 9.6 pounds. One industry requirement is that the reinforcement aluminum bars must not exceed ½ deflection at the midpoint, when 2,800 pounds of uniform weight load is distributed on a 40"×48" plastic pallet. The pallet is supported along both of it's 48" edges and is not permitted to exceed ½" deflection after 10 days. The pallet is subjected to environment changes including heat, cold and humidity.

A bar made of the new composite material has been made and satisfies the deflection requirement mentioned above. The bar included a composite material core having 48% by weight PQ ceramic microspheres and 52% by weight resin and flanked with 46K lineal carbon fiber. The new composite material bar performed to the required stiffness with an overall weight reduction of about 6.83 pounds over aluminum (a 75.6% reduction) and about 25.8 pounds over steel (a 92.14% reduction), and at a significantly lower cost relative to aluminum.

Specific Gravity

The new composite material also exhibits remarkable specific gravity properties. A sample of the new composite material was made utilizing 3M™ Scotchlite glass bubbles #K46 with Ciba 8601 resin matrix material, and a 46K flanking carbon fiber layer on both sides. The K46 3M™ Scotchlite glass microspheres have a true density of 0.46 (g/cc). The resin and fiber layers both have a specific gravity significantly above 1.0. However, the sample composite material actually floats in water and has an estimated specific gravity to be approximately 0.80. Generally, the new composite material can have a specific gravity of from about 0.38 to about 2.2, and preferably less than 1.0. The specific gravity may exceed 1.0 if denser core materials are used.

A sample composite material of the present invention having Ciba two-part epoxy resin #8601 as the matrix material with 3M™ K1 hollow microspheres has a specific gravity of 0.38. The composite material includes about 25% by volume resin and about 75% by volume microspheres. Adding lineal 24K woven carbon fiber flanking on both sides of the rectangular shaped composite material core increases the specific gravity to about 0.71 depending on the core thickness.

Acoustics

The new composite material also exhibits remarkable acoustic properties. A ½" thick board of the new composite material was made and tested for acoustic insulation. The sample composite material board included Ciba two-part epoxy resin #8601 as the matrix material with 3M™ K1 hollow microspheres. The composite material included about 85% by weight resin and about 15% by weight microspheres. The specific gravity of K1 spheres is 0.125. The sample composite material board was tested by blocking the sound exit to a Bose Acoustic Wave™ compact speaker by placing the board against the speaker outlet. A decoupling acoustic foam diaphragm was placed along the sides of the speaker to block flanking noise. The speakers were turned on and the sound reduction was observed. This composite material sample significantly reduced the acoustic output, including the most difficult low frequency bass notes.

The acoustic insulation properties and high strength of the new composite material lends the composite material to be used for residential and commercial construction. For example, wall panels (such as 4'×8' or 4'×10' wall panels) could be made from the composite material that could be used for both interior and exterior walls for residential and commercial construction. The composite material walls would provide advantages over aluminum or vinyl siding, stone or brick, and insulation construction materials. Also, in high humidity climates, many wall covering materials, including stucco, seriously degrade when trapped moisture or water enters between the walls. Walls constructed from the new composite material would be impervious to virtually all outside environmental elements, including moisture.

Conductive Properties

The new composite material can also exhibit remarkable conductive properties by including carbon fiber in the material. A sample of the new composite material that included carbon fiber was made and electric current was applied to the sample. By weight, the core included 39% 3M™ K46 microspheres and 61% resin. Carbon fiber 46K flanked the core. An electrical power source was connected to one side of the sample composite sandwich, specifically to the carbon fiber, and the temperature of the composite material sample heated remarkably well without apparent damage to the sample. The sample composite plaque heated uniformly to a high temperature, which burned to the touch, in less than one second. The electrically conductive carbon fiber served as the heat-generating source, while the matrix material and microsphere core is electrically insulative. Conductive materials other than carbon fiber can also be used.

The composite material having electrically conductive additives, such as carbon fiber, can be used to generate heat in a controlled manner and uniformly heat desired surfaces. For example, entire walls or other surfaces could be heated by using the composite material. A transformer or other electrical control device could be used to regulate the amount of current applied to the composite material, and thus, regulate the amount of heat generated by the composite material.

Using walls constructed of the composite material to heat rooms would be a breakthrough for room heating as compared to traditional gas forced air, electric baseboard, hot water radiator, and propane heating. Such room heating structures using the composite material also offer great potential for military, recreational, permanent or temporary shelters, and other shelters. Other applications could include, but are not limited to, for example, heated surgical or medical tables, emergency vehicle stretchers, and medical examination equipment such as female mammogram equipment. The discomfort experienced by a patient when subjected to cold surfaces is unnecessary and could be potentially eliminated by use of the new composite materials.

Infrared Frequency and Transmission Shielding

The new composite material can also exhibit remarkable infrared frequency and transmission shielding properties for Electro Magnetic Interference/Radio Frequency Interference (EMI/RFI). By providing copper powder or an equivalent material on the face or inside of plaques made from the new composite material, the plaques can uniquely shield both internal and external transmission waves. Examples of applications for infrared and transmission shielding could include military applications, military field vehicles, aircraft, watercraft, and shielding personnel from infrared detection. The composite material could be used to avoid transmission detection from satellite or other surveillance techniques.

Formability

Another property of the new composite material is formability. The composite materials can be easily formed into a desired shape prior to hardening of the matrix material. Also, after the matrix material is cured, the rigid composite material can be easily formed into desired shapes, by slitting, cutting, machining, sanding, molding and die cutting, for example.

EXAMPLES OF METHODS OF MAKING THE COMPOSITE MATERIAL

Various processes could be used to make the new composite materials of the present invention. Several methods that could be utilized for manufacturing the composite materials are described below. These manufacturing methods could be used to make composite material boards or shaped parts, such as golf club driver heads, for example.

Mixing and Molding

One example of a method of making the new composite material is mixing the uncured composite material, molding the mixed composite material into a desired shape, and then curing the molded composite material. Small particles, such as hollow microspheres, are mixed with a matrix material to achieve a desired density of microspheres, and a desired consistency of the material. For example, sufficient microspheres can be thoroughly mixed with the matrix material to achieve a clay-like uncured mixture. Other components can be mixed into the mixture if desired.

The uncured composite material mixture is molded or otherwise formed into a desired shape. Molds can be used, of course, to obtain a specific desired shape. Heat can be applied during the molding process if desired. The clay-like uncured composite material can even be free-formed by hand into desired shapes. Flanking materials or other components can be added to the matrix material/microsphere mixture as desired. The matrix material in the molded composite material is then cured to form a rigid molded product. Curing of the composite material can be accomplished by various methods, depending on the matrix material used. For example, the composite material can be cured by heat, curing agent, light, or microwaves.

A mixing and molding process was used to make sample composite material plaques. The sample plaques have a flat, generally square or rectangular shape. Hollow microspheres were mixed with automotive grade polyester, phenolic or vinyl ester resins to saturate the resin with microspheres to form a core of clay-like uncured composite material mixture. The clay-like composite material mixture core was flattened in a sheet molding compound (SMC) hydraulic plaque press into a flat, plate-like plaque shape, and then the flattened core was removed from the press. Dry cross-woven carbon fiber was applied to both side faces of the composite material core. Optionally, filter paper (coffee-type filter paper) was flanked on both sides of the fibre/core/fiber sandwich-type structure and sealed on all four edges to form a sealed filter bag encasing the fiber/core/fiber structure. One suitable filter paper is made by Dexter Manufacturing and is called Grade 11697 Filter Paper. The encased structure was inserted into the hydraulic press, the press was heated, and the plaque press compressed the encased structure for approximately 3 minutes. The heat applied during compression cured the thermoset resin. Upon opening the press, the sample composite plaque was observed to have fully wetted-out the flanking woven fiber, and evidence of the microspheres was clearly visible through the transparent filter paper. The sample composite material plaques were pressed and cured in about 2 ½ to 3 minutes. This is a remarkably fast manufacturing time as compared to slow curing resin molding which can require 8–24 hours to cure and an additional 2–6 hours to post-cure. The ability to quickly manufacture products with the composite material of the present invention provides significant advantages, such as high-speed manufacturing, continuous sheet production lines, and reduces manufacturing costs.

The optional filter paper serves to contain the uncured composite material during compression. However, filter paper is not required. For example, a mold having a mold cavity could be used to contain the composite material during compression. Also, sample composite material plaques have been made without the filter paper and instead using woven glass mat veil or cotton veil on back of lineal or cross woven fiber.

Additional sample composite material plaques (uncured clay-like composite material with carbon flanking) were formed into 5/16" thick plaques in a press. No heat was applied during the press compression. The uncured sample plaques were removed from the press and allowed to cure overnight into the finished sample plaques. This demonstrates that the new composite material can be cold-formed. Also, inexpensive presses and molds can be used to make composite material products quickly (about 10 to 15 seconds for the press or mold cycle times). Drying or microwave ovens can be used to quickly cure the composite material products outside of the presses or molds, which frees the presses and molds to form more composite material products. Also, the composite material could be joined with a flexible material, such as carpet, vinyl, and leather, to be pre-formed to a desired shape and then cured to take on the desired shape after curing.

Reactor Vessel

One example of a method of making the new composite material is by using a reactor vessel having a mold in a sealed vacuum chamber. The mold is subjected to the vacuum pressure and the fluid composite material having the matrix material and the microspheres forms a fluid seal over the inlet to the mold. The fluid composite material is infused into the mold by a pressure differential between inside the mold and outside of the fluid composite material. The composite material inside the mold is cured or hardened and then the molded part is removed from the mold. The mold remains sealed from leaks prior to and during infusion of the fluid composite material into the mold. The vacuum in the vacuum chamber may be released when appropriate, such as after infusion of the composite material into the mold or prior to infusion, as long as the mold does not allow gas leaks to the inside of the mold.

The use of an enclosed vacuum chamber or closed-end commercial grade pipe, for example, can be utilized to create the necessary negative vacuum pressures needed to infuse a closed cavity mold, for example a plastic or silicon mold. It is has surprisingly been found that infusing the new composite material, having a matrix material such as epoxy, thermal-set materials, or polyester, into a closed vacuum chamber prior to depressurization, as a liquid seal over the mold inlet, will cause these liquids to infuse the microspheres and any additives, such as glass fiber, carbon fiber, glass or carbon fiber mat, fully into the mold so as to virtually eliminate all trapped gases. This results in an end product that mirrors the mold surfaces and eliminates traditional molding blemishes, poppers, and product surface defects.

The composite material can even be used to make molds that are then used to manufacture parts. Typically, most products to be molded require significant up-front tooling costs and manufacturing delays due to excessive demand for high-quality plastic or metal mold dies. The new composite material can be used to efficiently and quickly manufacture low-cost injection molded plastic molds (e.g., plastic core/cavity containers) that could optionally be disposable. If desired, the inside of the composite material mold could be Teflon™ coated or coated with other appropriate materials, and could be readily placed in multiple cavity trays for robotic infusion of the liquid composite material and post-curing operations. This method of making the composite material is particularly desirable for parts requiring exact tolerances, repeatable class one surfaces, and with cores such as foam.

FIG. 11 schematically shows one example of a system 46 and process for making the new composite material. The system 46 and manufacturing process will be described in terms of making plaques by encapsulation of ceramic tiles, but the system 46 and process can be used to make other products having the new composite material. The plaques produced by the system 46 and manufacturing process include a layer of in-plane but staggered ceramic tiles and layers of woven cloth fibers (carbon or glass fibers, for example), both of which are encapsulated by a resin, such as epoxy, having microspheres.

The process for making the encapsulated plaques includes placing a layer of ceramic tiles and layers of woven cloth fibers inside of a flexible container 48. The flexible container or bag 48 is open-ended at the top and sealed gas tight on the remaining three side edges. The flexible container 48 having the ceramic plates and layers of fibers is contained within a pressure vessel 50. The open-ended flexible container 48 is flanked by two flat end plates 52 and an inflatable bladder 54 contained within the pressure vessel 50 is adjacent to one of the flat end plates 52. The inflatable bladder 54 is inflated against one flat end plate 52 to exert pressure on the flexible container 48 and the "sandwich" of ceramic tiles and fiber layers.

A stainless steel vacuum tank 56 contains the pressure vessel 50 and is connected to a computer controlled vacuum system 58. Fluid composite material 60 (epoxy matrix material with microspheres) is provided from a reservoir 62 outside of the vacuum tank 56 to another reservoir 64 contained within the vacuum tank 56.

The computer controlled vacuum system 58 is actuated to apply a vacuum to the vacuum tank 56 by removing gas molecules from the vacuum tank 56. The flexible container 48 and its contents are subjected to the vacuum because the flexible container 48 and the pressure vessel 50 are open to the vacuum tank 56. The fluid composite material 66 contained within the reservoir 64 is also subjected to the vacuum and may be partially degassed. The vacuum pumping system 58 creates a vacuum in the vacuum tank 56 of about 0 or +1 torr scale. The vacuum level of about 0 or +1 torr can be created by using a roughing pump 68, for example. Also, a molecular pump 70 could be used if desired. A control system 72 controls the pumping process. The vacuum is applied for a time period of about up to 30 minutes.

The vacuum pumping system 58 does not need to create an intense vacuum within the vacuum tank 56 sufficient to significantly degas the contents within the vacuum tank 56, including the flexible container 48, the ceramic plates and the fiber layers within the flexible container 48, and the composite material within the reservoir 64.

After the vacuum tank 56 and its contents are subjected to the vacuum, the fluid composite material 66 flows from the reservoir 64 to the open top of the flexible container 48 and seals the flexible container 48 closed in a gas tight seal. The vacuum system 58 is turned off and the vacuum tank 56 is allowed to return to atmospheric pressure. A pressure differential is created between the composite material 66 in the reservoir 64 and the inside of the flexible container 48. The pressure differential forces the composite material 66 into the flexible container 48 to encapsulate the ceramic plates and layers of fibers. While the composite material 66 is forced into the flexible container 48, the flexible container 48 maintains a gas tight seal to prevent any gas molecules from entering inside the flexible container 48. The reservoir 64 must contain excess composite material 66 so that the seal between the open end of the flexible container 48 and the composite material 66 is not broken.

The flexible container 48 is transparent so that the progress of the composite material 66 into the flexible container 48 can be monitored. After the flexible container 48 is completely filled with the composite material 66, the encapsulated plaque is allowed to harden. The inflatable bladder 54 is deflated and the encapsulated plaque is removed from the flexible container 48. It is estimated that the flexible bladder 54 will exert pressure at approximately 10–30 psi on the flexible container 48 and its contents, before and after composite material infusion.

When making plaques, the intensity and duration of the vacuum used in the system 46 are insufficient to cause adsorbed and chemisorbed atoms and gasses within the fibers inside the container 48 to evaporate substantially from the fibers. Degassing the fibers in the flexible container 48 to a level which causes adsorbed and chemisorbed atoms and gasses to evaporate from the fibers would cause deterioration in the performance of the plaques. If the fibers are degassed by removing adsorbed and chemisorbed atoms and gasses the bond between the epoxy matrix material and the fibers becomes excessively strong. Such a strong bond would result in brittle plaques which are prone to fracture when impacted by projectiles. A somewhat weaker bond between the epoxy matrix material and the fibers is desired for plaques to avoid brittleness and increase the effectiveness of resistance to ballistic attack. The plaques made by the system 46 and manufacturing method are strong yet somewhat "forgiving" to provide effective protection against ballistic attack. Of course, the system 46 and manufacturing parameters may be changed for other applications.

For making plaques, it is desirable for the encapsulation system 46 and process to maintain a gas tight seal within the flexible container 48 during infusion of the composite material 66. If a gas tight seal is not maintained within the flexible container 48, gas molecules may enter into the flexible container 48 and compromise the plaque. For example, a gas leak may reduce the amount of composite material 66 that enters the flexible container 48 to form the plaque and may compromise the bonds created between the epoxy matrix material, the ceramic plates and the fiber layers. Obviously, a compromised plaque may result in reduced ability to defend against injury from ballistic projectiles.

The system 46 and manufacturing process can provide a low cost manufacturing method for the encapsulation of ceramic plates and/or tiles in a monolithic matrix which may include ceramic tiles, backing material and spall shields for ballistic protection against small arms attack. Plaques can be designed to include ease of integration into existing systems and structures such as vehicles, tactical shelters and personnel apparel, for example. The plaques may exhibit a significant weight reduction as compared to existing ballistic structural materials. Furthermore, the system 46 and manufacturing process may provide cost-effective production which would permit large-scale armor plaque manufacture in a single production step. Ultimately the process could lead to single pour composite chassis construction, stealth applications for vehicle body thermal control systems and overall vehicle weight reductions.

The new system 46 and manufacturing method provide significant advances over existing methods of manufacturing ballistic materials. Demands on structural materials for improved ballistic performance under various threats has been increasing. Today's typical construction involves encapsulation of ceramic tiles with outer prepreg spall layers mechanically glued to small array squares of ceramic ballistic tile. The array is backed with numerous additional layers of prepreg which are cemented and various methods are used to install the encapsulation on vehicles. Several problems can be associated with this process, including 1) wet hand lay-up; 2) bonding weakness between layers of prepreg, honeycomb or other backing plate, and ceramic tiles; 3) expensive production processes; 4) collateral damage between adjacent tiles; 5) tile replacement in the field; and 6) collision with field obstacles such as trees, vehicles and barriers resulting in catastrophic armor failure in vehicles, necessitating non-field repairs. The new system 46 and encapsulation process may address these problems, but, is not required to practice the present invention.

The new encapsulation process is a dry lay-up process that permits varied matrix chemical composition, fiber diameter and orientation (including unidirectional fiber), shot content and fiber length. The fibers can be used in an "as manufactured" form, engineered or blended with other materials, such as ceramic plates or powder, for maximum performance. Blind mechanical inserts can be incorporated into the plaque design for mounting to vehicles, aircraft or watercraft of all types and descriptions.

Sheeting Process

Another example of a method of making the new composite material is by using a sheeting process. Boards of the new composite material can be continuously manufactured or manufactured in a batches by the sheeting process. Advantages of the sheeting process include a low cost manufacturing method and the ability to produce end product having the composite material.

One sheeting process to make composite material boards includes the following steps.

1. Pre-mixing ceramic or glass microspheres into the matrix material to a consistency of pancake batter to form the fluid composite material.

2. A pan, similar to a cookie sheet, can be used to hold the components for making the board, or other mold form having a desired shape. One pan used to make a composite material board had dimensions of 6" width ×50" length ×1 ¼" depth. A plastic 24 mil thick flexible film (dimensions 24"×58") made of HDPE (high-density polyethylene) was laid as a liner in the pan so as to permit the fluid composite material and fiber to be added.

3. A sheet of filter paper was placed on top of the flexible film liner with the impregnated heat-activated glue side facing upward. The filter paper should be selected such that the fluid matrix material can pass through the filter while the microspheres and other solid additives are prevented from passing through the filter, for example, the filter should have a pore size smaller than the size of the microspheres, but large enough to allow the matrix material to pass through the filter. The liner is sufficiently larger in size than the pan and the filter to permit folding the liner over and on top of the components in the pan to form a package. Also, the liner is sufficiently large so that the top and bottom free edges of the liner can be sealed together form the package.

Use of filter paper is optional. For example, carbon fiber having veil liners can be used. These veils are made of cotton or nonwoven glass fiber mat.

4. Woven fabric (glass, carbon fiber, glass mat, or high strength aramid type materials, for example) or other materials can be placed directly on top of the lower filter paper in the pan. These materials may provide increased strength or other desired properties for the end product. If the carbon fiber having a veil liner is used, the fiber can be placed on the film liner instead of the filter paper.

5. The matrix material is mixed with the microspheres and any other desired components to form the fluid composite material. The composite material can be manually or computer controlled blended, for example. The fluid composite material is then poured or dispensed uniformly in the pan, and the materials mentioned in step number 4, if any. Additional thickening agents and other resin modifiers can be added for specific enhancements of production products.

6. The materials mentioned in step number 4 can also be placed on top of the fluid composite material. For example, a duplicate material matching the bottom fiber is then placed over the fluid composite material. To prevent the top layer fiber material from sinking into the fluid composite material, a separate filter paper of equal size is heat sealed to the top of the fiber layer, or the carbon fiber with a veil liner can be used. The porosity of the filter paper is less than the average microsphere diameters, and when the assembly is clamped will only permit the liquid matrix material to pass through. This also increases the microsphere densities in the matrix material and decreases the product weight. In most applications, weight reduction and increased strength are desirable attributes.

7. Above or below the filter paper envelope or the veil liner, a grating (similar in shape to those used in common office overhead light fixtures) or spacer having matrix material receiving voids is provided that will permit excess matrix material to flow into the voids when pressure is applied to the top or bottom of the sandwich package.

8. The flexible liner is then folded on top of the layered components and sealed on the edges to form a sealed package.

9. A pressure plate is then nested on top of the pan and package assemble and clamped. The clamped assembly can be rotated 90° to a vertical orientation or any other orientation after this point as desired.

10. The clamped package is placed inside a pressure applicator, such as a pressure chamber of slightly larger dimension having an inflatable bladder, and pressure is applied to the pressure plate. Excess matrix material is purged from the fluid composite material by passing through the filter papers or veil liners and the density of the microspheres in the composite material is increased. Gradual pressure is applied so as to not cause the filter to rupture or blowout its sides. The pressure applied to the assembly may be monitored and controlled to ensure proper compaction, densification of the microspheres, and removal of excess matrix material, while avoiding rupture of the filter paper and the sealed liner. As the excess matrix material passes through the filter paper, the matrix material may enter into the voids in the grating or spacer. Approximately 10–20 psi pressure is used to compress the package, force the matrix material out through the filter or veil liner, and force the microspheres close together, for example. Other pressures may be used as needed depending on the particular application. Even less than 10 psi such as, hand pressure with clamp pressure, has been used to mold the new composite material. These low molding pressures are significantly less than commonly used molding pressures (such as 1000–1200 psi) to mold SMC or other compression molding techniques.

11. The matrix material in the compressed package is cured or hardened, and then the package is disassembled to produce the new composite material.

12. If desired, trapped air inside the assembled package can be removed prior to curing the matrix material. For example, the uncured, fluid composite material could be degassed by application of a vacuum, prior to and/or during compression. The level of vacuum can be adjusted to remove the desired amount of gas, such as a general vacuum could be applied so as to minimize trapped gases or a molecular pump could be used to degas at a greater level. Additionally, the microspheres appear to displace otherwise trapped gases, and if unobstructed gas exit pathways are engineered into the product design, the gas exit pathways could permit the gas to escape. Compression aids in removing trapped gases.

It should be noted that trapped gases are an ongoing problem for existing composite material manufacturing, including SMC molding, despite vacuum assisting devices. It is believed that reactive resins or polymers produce gas during their curing or reaction process.

Tube Fabrication

Another example of a method of making the new composite material is by using a tube fabrication process. The tube fabrication process includes infusing pre-mixed fluid composite material into a tube. Matrix material, microspheres, and other components, if desired, are mixed together to form the pre-mixed fluid composite material. The microspheres are mixed into the matrix material at a high density. Also, reinforcements, core inserts, or other inserts could be placed inside the tube prior to infusion of the fluid composite material. The composite material inside of the tube is cured or hardened to form the molded product.

FIG. 8 shows an example of a device 24 made according to the tube fabrication process. Fluid composite material was infused into the rigid outer tube 26 and hardened to form the core 28 of composite material.

Although the high-density packing of the microspheres can be achieved by pre-mixing the microspheres into the matrix material prior to infusion, the dense packing of microspheres can be increased further. One or more openings could be provided in the tube and the openings covered with filter paper similar to the sheeting process discussed above. As the fluid composite material is infused into the tube, excess matrix material will pass through the filter paper and exit the tube. The microspheres inside the tube will be packed in the matrix material at an even higher density by forcing out excess matrix material while retaining the microspheres inside the tube. The tube fabrication process could also be used by infusing the fluid composite material into other containers or molds, even flexible or inflexible containers or molds.

By way of example of the tube fabrication process, prototype samples were made which used a variety of plastic tubing infused with pre-mixed composite material. The tubing samples contained various reinforcements of pre-woven metal, traditional rope or line (synthetic or natural), and lineal continuous carbon fiber tow. The composite material included Ciba 8601 resin at 61% by weight and 3M™ K46 spheres at 39% by weight.

Composite Material Backing

Another example of a method of making products with the new composite material is to use the composite material as a backing for another material. Automotive body panels, cockpit modules, hatch back doors, hard trim, exterior composites, trim, and other surfaces could be backed with the new composite material. A variety of structures could be fortified with the new composite material to lower the weight and enhance other properties, such as strength. Lowering weight while maintaining strength is desirable in automotive applications. Additionally, class "A" surfaces can be achieved by use of thin film appliques to the face of the composite backing material.

The new composite material can be squeezed between filter paper or fiber having a veil liner—similar to the sheeting process discussed above—to reduce the matrix material volume and increase the density of microspheres to form an uncured composite material having a consistency about the same as clay. This flexible sandwich could then be placed between two pieces of thermoplastic layers, with the thermoplastic layers directly against the filter paper if desired. A compression mold or vacuum assist mold, for example, would close, compress and form the assembly into a desired shape. The inside core of composite material is cured. The core of composite material is attached to the thermoplastic layers during the molding process and a product having a desired shape is produced.

Various end products can be made by backing materials with the new composite material. For example, a layer of material having a class one surface for automotive use could be backed with the new composite material to form a new class one surface panel.

EXAMPLES OF COMPOSITE MATERIAL APPLICATIONS

The new composite material technology of the present invention may have endless uses or applications. Examples of applications of the new composite material may be evident by reading other areas of the disclosure; however, the following applications further exemplify uses for the new composite material. The following applications of the new composite material technology are merely examples of uses of the composite material to illustrate the wide variety of potential applications. The composite material invention is not intended to be limited to only these application examples. The inventors contemplate that the composite material technology can be used in these examples and other areas, presently known and unknown.

Many products could utilize this composite material technology, for example, stoves, refrigerators, water heaters, housing and building construction, portable housing for camping, aircraft construction, and military applications. Further examples of applications for the new composite material technology include aerospace, marine, automotive, automobile body construction, reinforcements for pallets, boat hulls, docks, decking, walls, recreational products, snow boards, highway acoustic barriers, pool tables, and skis. Thermal insulators and barriers are further applications of the new composite material, such as cryogenic tanks.

Sheet-type Parts Manufacturing

Manufacturing of parts from sheets or boards is another application of the new composite material. For example, boards or sheets can be manufactured having a core of the new composite material which is flanked using a variety of high strength materials on a continuous production line, similar to traditional wallboard manufacturing. Many automotive or industrial die cast parts, including aluminum parts, could be easily die-cut from such a sheet and later machined to targeted part specifications. The new sheet boards can also be slit to desired widths and cut to appropriate lengths. Also, the new composite material boards can be extruded from an extrusion line, and cut, slit or machined as desired.

Leaf Springs and Torsion Bars

Leaf springs and torsion bars are additional applications for the new composite material, and can be constructed similar to the device 10 shown in FIG. 1. Composite material leaf springs and torsion bar can be used for a variety of industries, including the automotive, off the highway vehicles, trucks, buses, and motorcycles, for example. The new composite material leaf springs and torsion bars are lightweight and have an excellent memory function, i.e. they return to their original position after a deflection load is removed from the composite material. Preferably, the leaf springs constructed and positioned such that they are side-loaded (a force applied perpendicularly to the page in FIG. 1) with the fiber flanking 16 vertically on a longitudinal edge. This position of the new composite material springs greatly enhances the stiffness properties of the material because the fiber is stacked and stabilized by spheres and resin to increase the flexural modulus when side-loaded compared to top loading on a flat face of the flanking. Holding or aligning the fibers in the vertical position provides superior springs, shock absorbers, and vibration buffering devices.

Glass microspheres can resiliently deform when a force is applied to the microspheres. Accordingly, a composite material of the present invention having glass microspheres can exhibit advantageous resilient deformation when placed under a load.

Fire-fighting

Fire-fighting products are another application for the new composite material. Lighter weight fireman helmets and protective gear can be fabricated utilizing the new composite material, particularly a thin-walled composite material layer. Additionally, aluminum ladders can be replaced with ladders made from the new composite material. The new composite material ladders provide sufficient strength while significantly reducing the weight of the ladders. A typical portable 28-foot aluminum ladder weighs about 78 pounds. However, a 28-foot ladder made with the new composite material weighs approximately less than 18 pounds, a remarkable weight reduction.

Tubing

One example of an application of a new composite material product is to replace existing metal tubing with composite material tubing. The composite material tubing could be made by the tube fabrication process discussed above. Plated steel tubing is commonly used for grocery cart construction. The plated steel tubing could be replaced with plastic tubes having the new composite material infused into the tubes to make grocery carts. Rust and corrosion due to exposure to salted parking lots is a problem for metal grocery carts, and the new composite material tubing is not subject to rust corrosion. Also, the new composite material tubing is lighter in weight than the metal tubing.

Several sample composite material tubes were made using PEEK convoluted tubing (corrugated). The corrugated tubing permits bends, such as 90° bends, without compromising the internal tube dimensions. The corrugated tubes used to make the samples were bent to desired angles and infused with the new composite material. The composite material included Ciba 8601 resin at 61% by weight and 3M™ K46 microspheres at 39% by weight. The bent tubing is held in a fixture and the matrix material is cured, for example in a heat-curing oven, to form the composite material tubing. To eliminate the need for fixtures to hold the corrugated tubing in a desired shape during composite material infusion and curing, a wire could be inserted in the center of the corrugated tubing to maintain the shape. Additional applications for new composite material tubing could include, for example, wheelchairs, canes, walking sticks, and other tubing applications.

Automotive Impact Structures

Yet another application of the new composite material is for automotive and impact structures. Bumper beams, side impact structures, roll bars, and body panels could be made from the new composite material. The use of the new composite material as a structure core or I-beam design could dramatically reduce weight for future automotive designs for these structures. It is believed that stratified layers of ceramic or glass microspheres with a range of crush pressures from 250 psi to 60,000 psi could result in a near-perfect collapsible and impact energy absorbing structure. The composite material structures may be flanked with appropriate glass, carbon, or aramid fibers. Depending upon desired compression strength targets, the composite material could be fortified with short or medium line chopped fiber and with appropriate flanking materials to complete the beam design approach.

The new automotive structures made from the new composite material provides significantly improved structures which would be lighter in weight and exhibit superior structural performance, strength and impact energy absorption. The composite material structure can have multiple layers of different crush strengths. A layer of relatively lower crush strength is provided on one side and successive layers of increasing crush strength are placed on top of the first layer. The multi-layered material can be attached to other materials, if desired, such as plastic or metal layers or ceramic plates. The nature of the microspheres with hollow centers and selectable crush ratios of the microspheres could be selected with the lightest microsphere (e.g., 250 lb crush strength) at the face, and increasing crush strength selectively by layer toward the back of the bumper. This technique would permit a gradual absorption of energy from the object struck which is a similar principle used at Indianapolis for race cars barriers filled with water or sand as they leave the track to enter the pits. Solid spheres could prove useful in this design as well.

This is also similar to the principle used in ballistic armor applications where the outer layer (spall layer) is made of a Kevlar® woven fabric, followed by a military grade ceramic with honeycomb aluminum backing and a sandwich of epoxy stitched 9-ply sandwich at the rear. This design intends for the armor-piercing round to pierce the outer spall liner impacting the ceramic plates, resulting in deformation of the projectile's nose cone, fragmentation, and optimistically fragments are caught by the 7–9 ply sandwich at the rear.

An example of a military ballistic plaque having the new composite material was made. The sample ballistic plaque included a 5/16" thick composite material attached to a piece of 1/4" thick, 12" square marble tile. The composite material included Ciba 8601 resin at 61% by weight and 3M™ K46 microperes at 39% by weight. The sample ballistic plaque having the composite material was repeatedly dropped from a height of about 6 feet to the floor, having unbacked industrial grade carpet on concrete, without breakage. As a comparison, the same marble tile unprotected with the new composite material dropped from the same height to the same floor shatters like glass. The new composite material strengthens ceramic/marble plates and can be used as ballistic armor plaques. Also, the new composite material plaques can replace aluminum, phenolic, titanium or other honeycomb material used for ballistic plaques that has had mediocre field performance.

While the presently preferred embodiments have been illustrated and described, numerous changes and modifications can be made without departing from the spirit and scope of this invention. Therefore, the inventors intend that such changes and modifications are covered by the appended claims.

The invention is claimed as:

1. A composite material comprising:
   a cross-linked polymeric material which is generally indispersible in water, and
   a plurality of microsphere particles in the polymeric material, the microsphere particles ranging from about 69% by volume to about 85% by volume of the composite material and consisting essentially of diameters ranging from about 1 micron to about 350 microns;
   wherein the composite material is substantially free of voids in the polymeric material between the microsphere particles.

2. The composite material of claim 1, wherein the plurality of particles range from about 69% by volume to about 81% by volume of the composite material.

3. The composite material of claim 1, wherein the plurality of particles comprise about 75% by volume to about 85% by volume of the composite material.

4. The composite material of any one of claims 1–3, wherein the plurality of particles comprise at least a plurality of first particles and a plurality of second particles having different sizes compared to each other.

5. The composite material of any one of claims 1–3, wherein the plurality of microsphere particles are hollow microspheres.

6. The composite material of claim 5, wherein the hollow microspheres comprises at least two different sized microspheres.

7. The composite material of any one of claims 1–3, wherein substantially any given distance between adjacent microsphere particles is less than a diameter of the smallest microsphere particle.

8. The composite material of any one of claims 1–3, wherein substantially all of the plurality of particles are in contact with adjacent particles.

9. The composite material of any one of claims 1–3, wherein the particles are selected from the group consisting of ceramic particles, glass particles, plastic particles, and combinations thereof.

10. The composite material of any one of claims 1–2, wherein the polymeric material is selected from group consisting of epoxies, polyesters, vinyl esters, phenolics, thermoplastics, thermosets, polyurethanes, glues, cements, matrix material binders, and combinations thereof.

11. The composite material of any one of claims 1–3, further comprising at least one layer of material in contact with the polymeric material having the particles.

12. The composite material of claim 11, wherein the at least one layer is selected from the group consisting of carbon fibers, glass fibers, uni-directional fibers, cross woven fibers, matte fiber, fiber braid, uni-directional stitch woven carbon fiber braid, plastics, leathers, foils, metals, laminates, composites, thermoplastics, thermoset materials, resins, ceramics, vinyls, rigid materials, flexible materials, flanking materials, and combinations thereof.

13. The composite material of any one of claims 1–3, wherein the composite material has a specific gravity of from about 0.38 to about 2.2.

14. The composite material of any one of claims 1–3, wherein the composite material has a specific gravity of less than 1.0.

15. A composite material comprising:
   a non-water-dispersible cross-linked polymeric material from about 15% by volume to about 31% by volume; and
   microspheres from about 69% by volume to about 85% by volume, substantially all of the microspheres having diameters ranging from about 1 micron to about 350 microns;
   wherein the composite material is substantially free of gas space in the polymeric material between the microspheres.

16. The composite material of claim 15, wherein the polymeric material is from about 19% by volume to about 31% by volume, and the microspheres are from about 69% by volume to about 81% by volume.

17. The composite material of claim 16, wherein the polymeric material is about 25% by volume, and the microspheres are about 75% by volume.

18. A composite material comprising a water non-dispersible cross-linked resin matrix binder material and microspheres, the microspheres having a volume of about 75% to about 85% of a volume of the matrix binder material combined with the microspheres and consisting essentially of diameters ranging from about 1 micron to about 350 microns;
   wherein the matrix binder material is substantially free of voids between the microspheres.

19. A composite material comprising:
a core having a cross-linked polymeric material from about 15% to about 25% by volume of the core and which is generally indispersible in water, and microspheres from about 75% to about 85% by volume of the core, substantially all of the microspheres having diameters ranging from about 1 micron to about 350 microns; and
a flanking layer bonded to the core;
wherein the polymeric material is substantially free of voids between the microspheres.

20. The composite material of claim 19, wherein the core has flanking layers bonded to opposite sides of the core.

21. The composite material of claim 19, wherein the flanking layer substantially surrounds the core.

22. The composite material of claim 19, wherein the flanking layer is selected from the group consisting of carbon fibers, glass fibers, uni-directional fibers, cross woven fibers, matte fibers, fiber braid, uni-directional stitch woven carbon fiber braid, plastics, leathers, foils, metals, composites, thermoplastics, thermoset materials, resins, ceramics, vinyls, rigid materials, flexible materials, and combinations thereof.

23. The composite material of claim 1, wherein the microsphere particles consist essentially of diameters ranging from about 15 microns to about 120 microns.

24. The composite material of claim 23, wherein a substantial amount of the microsphere particles have about the same diameter.

25. The composite material of claim 15, wherein substantially all of the microspheres have diameters ranging from about 15 microns to about 120 microns.

26. The composite material of claim 25, wherein a substantial amount of the microspheres have about the same diameter.

27. The composite material of claim 18, wherein the microspheres consist essentially of diameters ranging from about 15 microns to about 120 microns.

28. The composite material of claim 27, wherein a substantial amount of the microspheres have about the same diameter.

29. The composite material of claim 19, wherein substantially all of the microspheres have diameters ranging from about 15 microns to about 120 microns.

30. The composite material of claim 29, wherein a substantial amount of the microspheres have about the same diameter.

31. The composite material of claim 1, further comprising a component selected from the group consisting of calcium carbonate, barium sulfate, fillers, zinc stearate, mold releasing agents, degassing agents, additives, inhibitors, thixotropes, thickening agents, resin curing agents, accelerators, promoters, catalysts, cross-linking agents, and combinations thereof.

32. The composite material of claim 15, further comprising a component selected from the group consisting of calcium carbonate, barium sulfate, fillers, zinc stearate, mold releasing agents, degassing agents, additives, inhibitors, thixotropes, thickening agents, resin curing agents, accelerators, promoters, catalysts, cross-linking agents, and combinations thereof.

33. The composite material of claim 18, further comprising a component selected from the group consisting of calcium carbonate, barium sulfate, fillers, zinc stearate, mold releasing agents, degassing agents, additives, inhibitors, thixotropes, thickening agents, resin curing agents, accelerators, promoters, catalysts, cross-linking agents, and combinations thereof.

34. The composite material of claim 19, further comprising a component selected from the group consisting of calcium carbonate, barium sulfate, fillers, zinc stearate, mold releasing agents, degassing agents, additives, inhibitors, thixotropes, thickening agents, resin curing agents, accelerators, promoters, catalysts, cross-linking agents, and combinations thereof.

35. A composite material comprising a water non-dispersible cross-linked resin matrix binder material and microspheres, the microspheres having a volume of about 69% to about 85% of a volume of the matrix binder material combined with the microspheres and consisting essentially of diameters ranging from about 1 micron to about 350 microns;
wherein the matrix binder material is substantially free of voids between the microspheres.

36. A composite material comprising:
a core having a cross-linked polymeric material from about 15% to about 31% by volume of the core and which is generally indispersible in water, and microspheres from about 69% to about 85% by volume of the core, substantially all of the microspheres having diameters ranging from about 1 micron to about 350 microns; and
a flanking layer bonded to the core;
wherein the polymeric material is substantially free of voids between the microspheres.

37. The composite material of claim 36, wherein the core has flanking layers bonded to opposite sides of the core.

38. The composite material of claim 36, wherein the flanking layer substantially surrounds the core.

39. The composite material of claim 36, wherein the flanking layer is selected from the group consisting of carbon fibers, glass fibers, uni-directional fibers, cross woven fibers, matte fibers, fiber braid, uni-directional stitch woven carbon fiber braid, plastics, leathers, foils, metals, composites, thermoplastics, thermoset materials, resins, ceramics, vinyls, rigid materials, flexible materials, and combinations thereof.

40. The composite material of claim 36, wherein substantially all of the microspheres have diameters ranging from about 15 microns to about 120 microns.

41. The composite material of claim 40, wherein a substantial amount of the microspheres have about the same diameter.

42. The composite material of claim 36, further comprising a component selected from the group consisting of calcium carbonate, barium sulfate, fillers, zinc stearate, mold releasing agents, degassing agents, additives, inhibitors, thixotropes, thickening agents, resin curing agents, accelerators, promoters, catalysts, cross-linking agents, and combinations thereof.

43. The composite material of claim 35, wherein a substantial amount of the microspheres have about the same diameter.

44. The composite material of claim 35, further comprising a component selected from We group consisting of calcium carbonate, barium sulfate, fillers, zinc stearate, mold releasing agents, degassing agents, additives, inhibitors, -thixotropes, thickening agents, resin curing agents, accelerators, promoters, catalysts, cross-linking agents, and combinations thereof.

* * * * *